US006291920B1

(12) United States Patent
Miller et al.

(10) Patent No.: US 6,291,920 B1
(45) Date of Patent: Sep. 18, 2001

(54) MOTOR COUNTER WEIGHT ATTACHMENT

(75) Inventors: Joseph E. Miller, Fort Wayne, IN (US); David W. Blue, Union, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/594,396

(22) Filed: Jun. 15, 2000

(51) Int. Cl.$^7$ ................. H02K 7/04; H02K 1/22

(52) U.S. Cl. .............. 310/261; 310/51; 74/573 R; 73/468

(58) Field of Search ............. 310/51, 261, 42, 310/74, 81; 73/66, 457, 458, 468, 469, 470; 74/573 R

(56) References Cited

U.S. PATENT DOCUMENTS

| 4,642,886 | 2/1987 | Muck et al. | 29/598 |
|---|---|---|---|
| 4,893,044 | * 1/1990 | Bush et al. | 310/51 |
| 4,933,583 | 6/1990 | Ripplinger | 310/156 |
| 5,373,208 | 12/1994 | Ichimura et al. | 310/154 |
| 5,386,163 | 1/1995 | Heilman | 310/51 |
| 5,831,358 | 11/1998 | Bobay | 310/58 |

FOREIGN PATENT DOCUMENTS 57-83146 * 5/1982 (JP) ............... H02K/15/16

* cited by examiner

Primary Examiner—Burton S. Mullins
(74) Attorney, Agent, or Firm—Michael Best & Friedrich LLP

(57) ABSTRACT

A counter weight system for an electric motor having a rotor with an end ring, the end ring having an outer surface, and at least one deformable lug extending from and a plurality of projections extending radially across the outer surface. The counter weight system includes a rotor counter weight having an inner surface abutting the end ring end surface; an outer surface opposite the inner surface; at least one bore through the rotor counter weight and receiving a lug, the lug being deformed to axially fix the rotor counter weight; a plurality of recesses in the inner surface, each recess receiving an end ring projection so as to prevent rotational movement of the rotor counter weight with respect to the end ring; and a plurality of rotor counter weight projections extending radially across the outer surface. The counter weight system also includes a generally circular shaft counter weight having an inner surface abutting the rotor counter weight outer surface, and a plurality of recesses in the shaft counter weight inner surface, each recess receiving a respective a rotor counter weight projection so as to prevent rotational movement of the shaft counter weight with respect to the rotor counter weight.

19 Claims, 3 Drawing Sheets

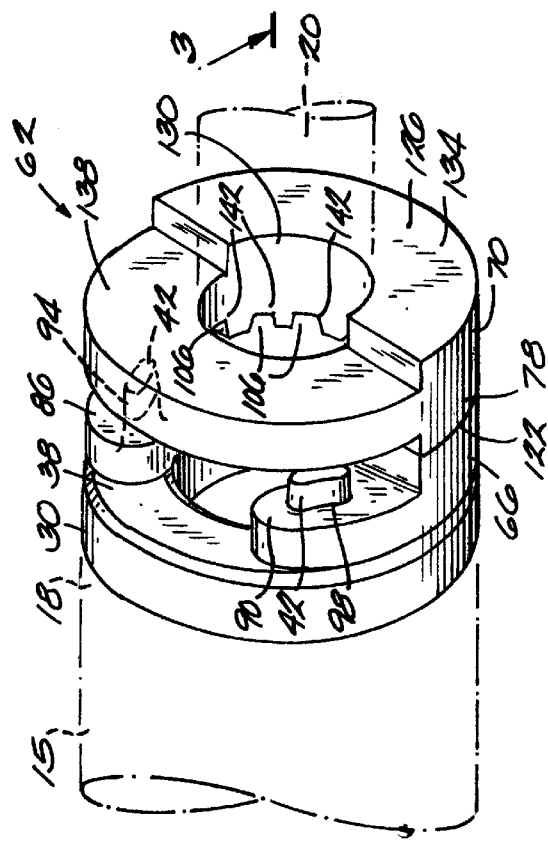
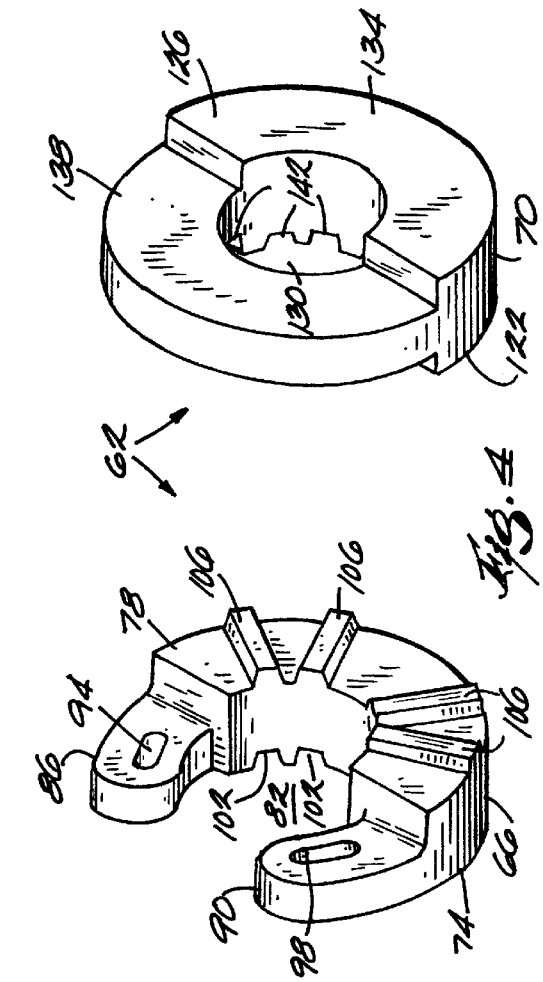
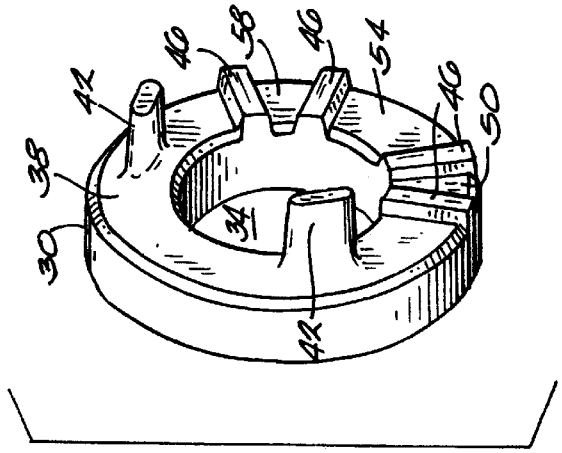

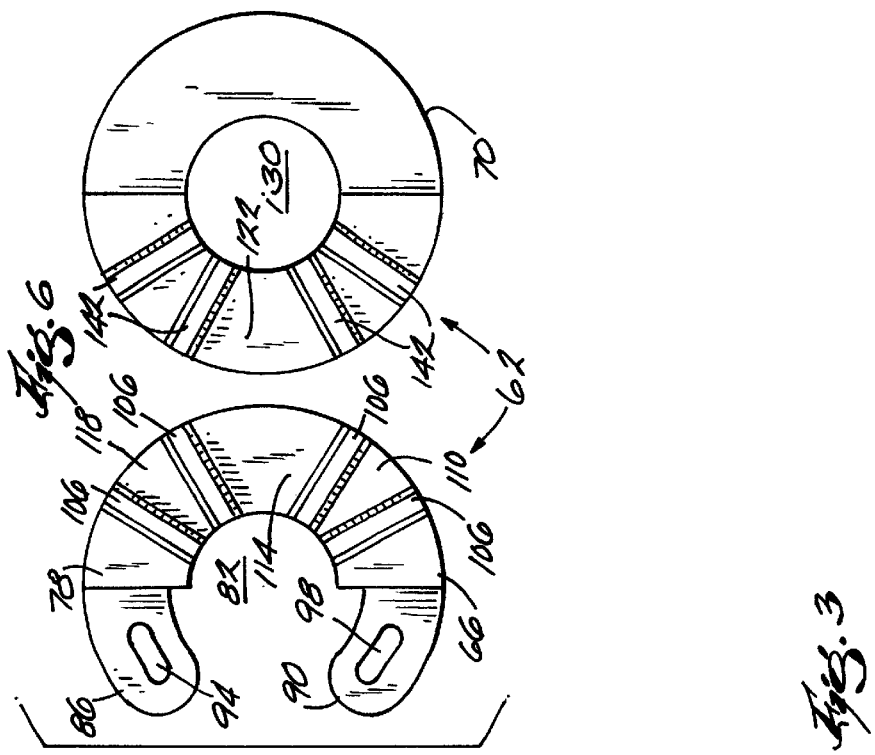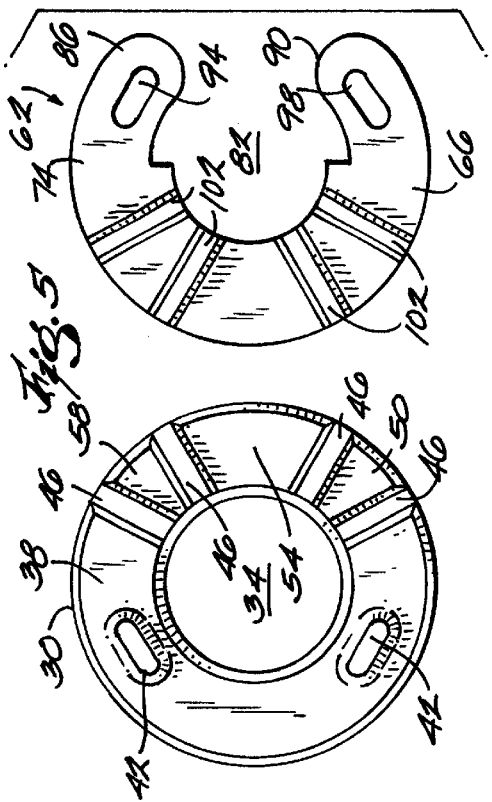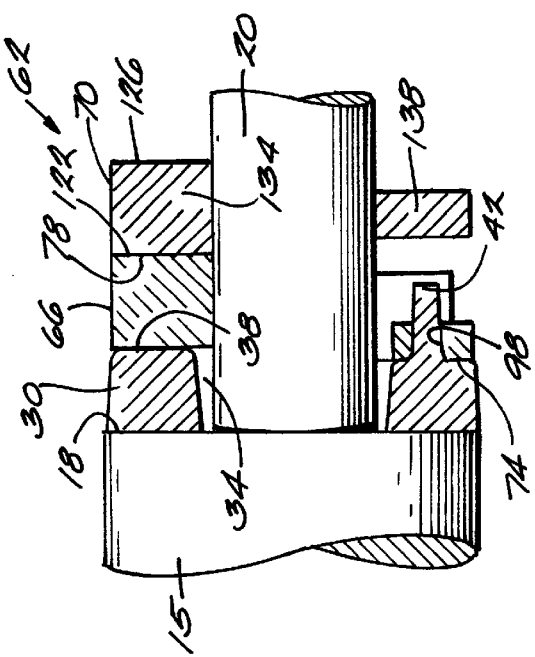

MOTOR COUNTER WEIGHT ATTACHMENT

FIELD OF THE INVENTION

The invention relates to counter weights for electric motors, specifically rotor and shaft counter weights and how they are attached to electric motor rotors and shafts.

BACKGROUND OF THE INVENTION

In prior art methods of attaching a counter weight to a rotor of an electric motor, the counter weight can be either installed in a receptacle in the rotor end ring, or mechanically attached to the end ring. A shaft counter weight is typically mechanically attached to the motor shaft in a spaced-apart relation from the rotor by heating the counter weight and placing it over a cold rotor shaft. When the shaft counter weight cools, a pressure bond is formed between the shaft counter weight and the rotor shaft, thus yielding a rotor in which the shaft counter weight is mechanically attached to the rotor shaft.

SUMMARY OF THE INVENTION

Using such a prior art method of attaching a counter weight to a rotor and a rotor shaft, the counter weights may loosen upon starting and stopping the motor. In addition, such an arrangement occupies valuable space between the motor and whatever mechanics the motor is driving, requiring a longer, more expensive shaft.

The invention provides a counter weight attachment in which the rotor counter weight and the shaft counter weight interlock to form a more solid unit that occupies less space.

The invention provides a counter weight system for an electric motor having a rotor with an end ring, the end ring having an outer surface, and at least one deformable lug extending axially from and a plurality of projections extending radially across the outer surface. The counter weight system includes a rotor counter weight having an inner surface abutting the end ring end surface; an outer surface opposite the inner surface; at least one bore through the rotor counter weight and receiving a lug, the lug being deformed to axially fix the rotor counter weight; a plurality of recesses in the inner surface, each recess receiving an end ring projection so as to prevent rotational movement of the rotor counter weight with respect to the end ring; and a plurality of rotor counter weight projections extending radially across the outer surface. The counter weight system also includes a generally circular shad counter weight having an inner surface abutting the rotor counter weight outer surface, and a plurality of recesses in the shaft counter weight inner surface, each recess receiving a respective a rotor counter weight projection so as to prevent rotational movement of the shaft counter weight with respect to the rotor counter weight.

The invention solves both the rigidity and space problems by allowing for interaction between the rotor and shaft counter weights and the use of a shorter shaft. As a result, the rotor and thus the motor experience fewer vibration problems. In addition, the amount of shaft material needed is also reduced because the shaft counter weight requires less space between the motor and the mechanics being driven.

Other features and advantages of the invention will become apparent to those skilled in the art upon review of the following detailed description, claims, and drawings.

BRIEF DESCRIPTION OF THE DRAWINGS

FIG. 2 is an enlarged perspective view of the electric motor counter weight system illustrated in FIG. 1.

FIG. 3 is a partially cutaway elevation view of the counter weight system illustrated in FIG. 1 taken along the 3—3 line of FIG. 2.

FIG. 4 is an exploded perspective view of the counter weight system illustrated in FIG. 1.

FIG. 5 is an unfolded plan view of the outer face of a rotor end ring and the inner face of a rotor counter weight used with the counter weight system illustrated in FIG. 1.

FIG. 6 is an unfolded plan view of the outer face of a rotor counter weight and the inner face of a shaft counter weight used with the counter weight system illustrated in FIG. 1.

Figure 1:
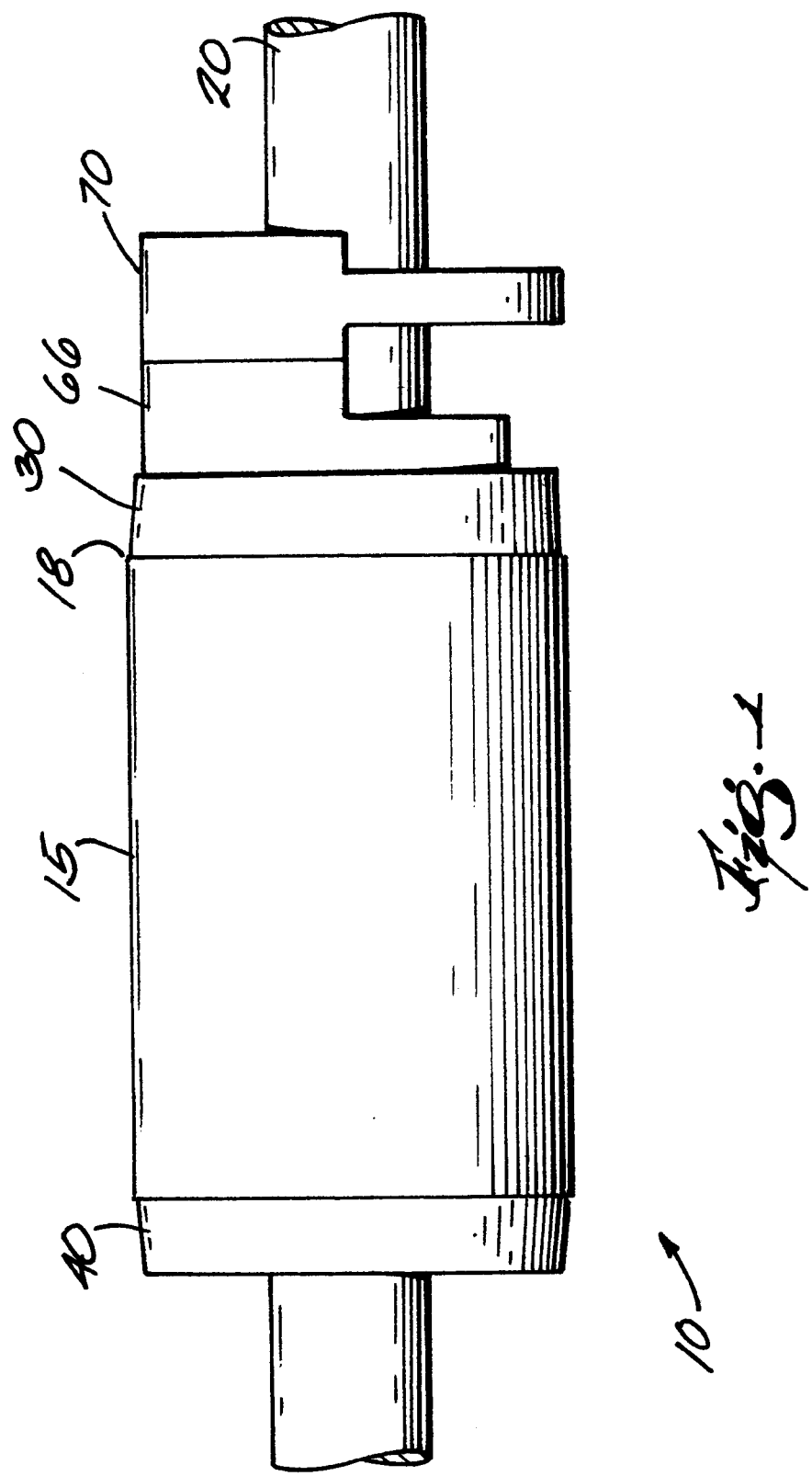
FIG. 1 is a schematic view of an electric motor rotor including a counter weight system embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENTS

An electric motor rotor assembly 10 embodying the invention is illustrated in FIG. 1. The assembly 10 includes a rotor 15. The rotor 15 is generally cylindrical, and has a first end 18. A generally cylindrical rotor shaft 20 of an electric motor (not shown) supports the rotor 15, the shaft 20 being supported by a housing (not shown) within a stator (not shown) such that the rotor 15 is rotatable relative to the stator. The output end of the shaft 20 is connected to machinery (not shown) such as a scroll compressor, but may be used with any suitable machinery.

The rotor 15 is illustrated best in FIGS. 2 and 3. The specific rotor embodiment shown is for exemplary purposes. The invention described herein may be used in any type of electric motor having a rotor supported by a shaft-like member. The rotor 15 also includes a generally circular rotor end ring 30 on the end 18 of the rotor 15 (see FIGS. 2 and 3). The end ring 30 is preferably formed integrally with the end 18 of the rotor 15. In other embodiments, the end ring 30 may be formed separately and attached to the first end 18 of the rotor 15, or the end ring 30 may be manufactured by any suitable method. Referring to FIG. 4, the end ring 30 has a central bore 34 through which the shaft 20 passes. The central bore 34 must have an inner diameter larger than the outer diameter of the rotor shaft 20 to accommodate the shaft 20. The end ring 30 has an outer surface 38 opposite the end 18 of the rotor 15. The rotor 15 may also include a second end ring 40 on the end of the rotor 15 opposite the end 18 (see FIG. 1).

The end ring 30 includes two deformable lugs 42 extending axially from the outer surface 38. The lugs 42 are preferably tapered to allow for easier construction, but may be any other suitable shape. The axial centerlines of the lugs 42 are spaced apart by approximately 120 degrees in this embodiment, but may have any suitable spacing. In other embodiments (not shown), the end ring may have any suitable number of lugs.

The end ring 30 also includes four substantially identical projections or cogs 46 extending radially across the outer surface 38 of the end ring 30. In the preferred embodiment, the four cogs 46 are each radially-elongated and axially-tapered, but may have any suitable number or shape. The axial centerlines of the cogs 46 define three arcuate spaces 50, 54, 58 between centerlines. The first and third spaces 50, 58 are approximately thirty degrees, and the second space 54 is approximately sixty degrees, but the spaces 50, 54, 58 may be of any suitable dimension.

Referring to FIG. 3, an interlocking counter weight system 62 surrounds the shaft 20 and is connected to the end ring 30. The counter weight system 62 includes two components: a rotor counter weight 66 and a shaft counter weight 70.

Referring to FIGS. 3 and 4, the rotor counter weight 66 has an inner surface 74 abutting the end ring outer surface 38, and an outer surface 78 opposite the inner surface 74. The rotor counter weight 66 has a central bore 82 through which the shaft 20 passes. The central bore 82 must have an inner diameter larger than the outer diameter of the rotor shaft 20 to accommodate the shaft 20. The rotor counter weight 66 is preferably formed from sintered iron, but may be formed from any suitable material.

The rotor counter weight 66 is generally C-shaped such that it has two ends 86, 90. Each end 86, 90 has therein a bore or aperture 94, 98 sized to receive an end ring lug 42, as best shown in FIG. 2. In other embodiments (not shown), the rotor counter weight can have any number of lug-receiving bores, as long as there are as many bores as there are lugs. In still other embodiments (not shown), any other suitable attachment means can be used in the place of lugs and bores.

Referring to FIG. 5, the rotor counter weight 66 includes four recesses 102 extending radially across the inner surface 74. In the preferred embodiment, the four recesses 102 are each radially-elongated and axially-tapered, but may have any suitable number or shape as long as the recesses are of sufficient size, shape, and position to receive the end ring cogs 46 so as to allow the rotor counter weight inner surface 74 to abut the end ring outer surface 38, and to prevent rotational movement of the rotor counter weight 66 with respect to the end ring 30.

Referring to FIGS. 4 and 6, the rotor counter weight 66 also includes four substantially identical projections or cogs 106 extending radially across the outer surface 78. In the preferred embodiment, the cogs 106 are radially-elongated and axially-tapered, but may have any suitable number or shape. The axial centerlines of the cogs 106 define three arcuate spaces 110, 114, 118 between centerlines. The first and third spaces 11 0, 118 are approximately thirty degrees, and the second space 114 is approximately sixty degrees, but the spaces may be of any suitable size.

Referring to FIGS. 4 and 6, the shaft counter weight 70 has an inner surface 122 abutting the rotor counter weight outer surface 78, and an outer surface 126 defining a thickness with the inner surface 122. The shaft counter weight 70 has a central bore 130 through which the shaft 20 passes. The central bore 130 has an inner diameter only slightly larger than the outer diameter of the rotor shaft 20 to accommodate a pressure fit with the shaft 20. The shaft counter weight 70 is preferably formed from sintered iron, but may be formed from any suitable material.

As best shown in FIG. 4, the shaft counter weight 70 has relatively thicker and thinner sections 134, 138, each occupying approximately half of the circumference of the shaft counter weight 70 in the preferred embodiment. In other embodiments (not shown), the thicker section 134 may occupy more or less of the shaft counter weight 70 as different counterbalancing weights are needed. In addition, the thickness of each section 134, 138 may also be varied to vary the overall weight of the shaft counter weight 70.

Referring to FIGS. 4 and 6, the shaft counter weight 70 includes four recesses 142 extending radially across the inner surface 122. In the preferred embodiment, the four recesses 142 are each radially-elongated and axially-tapered, but may have any suitable number or shape as long as the recesses are of sufficient size, shape, and position to receive the rotor counter weight cogs 106 so as to allow the shaft counter weight inner surface 122 to abut the rotor counter weight outer surface 78, and to prevent rotational movement of the shaft counter weight 70 with respect to the rotor counter weight 66.

For assembly of the counter weight system 62 on a rotor 15, appropriately-sized rotor and shaft counter weights 66, 70 are selected to meet the counterbalancing requirements of the motor and the machinery attached to the shaft 20. The rotor counter weight 66 is placed over the shaft 20 and aligned with the end ring 30 such that the end ring lugs 42 project into the rotor counter weight bores 94, 98 as shown in FIG. 2, and such that the end ring cogs 46 are received by the rotor counter weight recesses 102. The deformable lugs 42 are then deformed or coined such that the lug material deforms over the rotor counter weight outer surface 78, thus locking the rotor counter weight 66 to the end ring 30 to prevent axial movement of the rotor counter weight 66.

The shaft counter weight 70 is then heated and placed over the shaft 20 and aligned with the rotor counter weight 66 such that the rotor counter weight cogs 106 are received by the shaft counter weight recesses 142, as shown in FIG. 2. The shaft counter weight 70 locks onto the shaft 20 as the shaft counter weight 70 cools to prevent axial movement of the shaft counter weight 70. As a result, the rotor and shaft counter weights 66, 70 are prevented from both radial and axial movement, and occupy less space on the shaft 20 than prior art counter weight systems because of their interlocking nature. Occupying less space allows for a shorter shaft 10 and a stiffer, more compact motor/counter weight system.

In alternative embodiments (not shown), the cog and recess relationships may be partially or completely reversed. For example, the end ring 30 might be manufactured with recesses on the end ring outer surface 38 in the place of the end ring cogs 46; consequently, the rotor counter weight 66 would need to be manufactured with cogs on the rotor counter weight inner surface 74 in the place of the rotor counter weight recesses 102. As another example, the end ring 30 might be manufactured with one recess and three cogs on the end ring outer surface 38 in the place of the end ring cogs 46; consequently, the rotor counter weight 66 would then need to be manufactured with one cog and three recess on the rotor counter weight inner surface 74 in the place of the rotor counter weight recesses 102. Similarly, any combination of matching cogs and recesses can be used between the end ring 30 and the rotor counter weight 66, and between the rotor counter weight 66 and the shaft counter weight 70. The invention is not limited to the shapes, sizes, or positioning of the cogs and recesses as disclosed.

Various features of the invention are set forth in the following claims.

What is claimed is:

1. An electric motor rotor assembly comprising:

a rotor having an outer surface and a deformable lug extending from the outer surface; and a rotor counter weight mounted on the rotor, the rotor counter weight having an inner surface abutting the outer surface of the rotor and a bore through the rotor counter weight, the bore receiving the lug, the lug being deformed to axially fix the rotor counter weight to the rotor;

one of the rotor outer surface and the rotor counter weight inner surface having thereon a projection, and the other of the rotor outer surface and the rotor counter weight inner surface having therein a recess receiving the projection so as to prevent rotational movement of the rotor counter weight with respect to the rotor.

2. The electric motor rotor assembly of claim 1 wherein the projection is a cog.

3. The electric motor rotor assembly of claim 1, the rotor counter weight having an outer surface; and further comprising:

a shaft supporting the rotor, and a shaft counter weight fixed axially on the shaft, the shaft counter weight having an inner surface abutting the outer surface of the rotor counter weight, one of the rotor counter weight outer surface and the shaft counter weight inner surface having thereon a projection, and the other of the rotor counter weight outer surface and the shaft counter weight inner surface having therein a recess receiving the projection so as to prevent rotational movement of the shaft counter weight with respect to the rotor counter weight.

4. The electric motor rotor assembly of claim 3 wherein the projection is a cog.

5. The electric motor rotor assembly of claim 3, one of the rotor counter weight outer surface and the shaft counter weight inner surface having thereon a plurality of projections, and the other of the rotor counter weight outer surface and the shaft counter weight inner surface having therein a plurality of recesses receiving the projections.

6. The electric motor rotor assembly of claim 1, one of the rotor outer surface and the rotor counter weight inner surface having thereon a plurality of projections, and the other of the rotor outer surface and the rotor counter weight inner surface having therein a plurality of recesses receiving the projections.

7. The electric motor rotor of claim 1 wherein the rotor outer surface has thereon a second deformable lug, and wherein the rotor counter weight has therethrough a second bore receiving the second lug, the second lug being deformed to axially fix the rotor counter weight to the rotor.

8. The electric motor rotor of claim 7 wherein the rotor includes an end ring having thereon the lugs.

9. The electric motor rotor of claim 8 wherein the counter weight is C-shaped and has opposites ends, wherein each bore is located adjacent a respective one of the ends, and wherein the recess is located in the rotor counter weight inner surface between the bores.

10. The electric motor rotor of claim 9 wherein the projection is a cog located on the rotor outer surface, wherein the rotor outer surface has thereon three additional cogs, and wherein the rotor counter weight inner surface has therein three additional recesses between the bores, each recess receiving a respective one of the cogs.

11. An electric motor rotor assembly comprising:

a rotor supported by a shaft;

a rotor counter weight attached to the rotor, the rotor counter weight having an outer surface; and a shaft counter weight fixed axially on the shaft, the shaft counter weight having an inner surface abutting the outer surface of the rotor;

one of the rotor counter weight outer surface and the shaft counter weight inner surface having thereon a cog, and the other of the rotor counter weight outer surface and the shaft counter weight inner surface having therein a recess receiving the cog so as to prevent rotational movement of the shaft counter weight with respect to the rotor counter weight.

12. The electric motor rotor assembly of claim 11, one of the rotor counter weight outer surface and the shaft counter weight inner surface having thereon a plurality of cogs, and the other of the rotor counter weight outer surface and the shaft counter weight inner surface having therein a plurality of recesses receiving the cogs.

13. The electric motor rotor assembly of claim 12 wherein the shaft counter weight is annular.

14. The electric motor rotor assembly of claim 13 wherein the rotor counter weight is C-shaped.

15. The electric motor rotor assembly of claim 14 wherein the cogs are located on the rotor counter weight, and wherein the recesses are located in the shaft counter weight inner surface.

16. An electric motor rotor assembly comprising:

a rotor having a first end;

a rotor shaft supporting the rotor;

a rotor end ring on the first end of the rotor, the end ring having
    an outer surface,
    a deformable lug extending axially from the outer surface, and
    a plurality of projections extending radially across the outer surface;

a rotor counter weight having
    an inner surface abutting the end ring outer surface,
    a rotor counter weight outer surface opposite the rotor counter weight inner surface,
    a bore through the rotor counter weight, the bore receiving the lug, the lug being deformed to axially fix the rotor counter weight to the rotor end ring,
    a plurality of recesses in the rotor counter weight inner surface, each recess receiving a respective end ring projection so as to prevent rotational movement of the rotor counter weight with respect to the end ring, and
    a plurality of rotor counter weight projections extending radially across the rotor counter weight outer surface; and a shaft counter weight having
    an inner surface abutting the rotor counter weight outer surface, and
    a plurality of recesses in the shaft counter weight inner surface, each recess receiving a respective rotor counter weight projection so as to prevent rotational movement of the shaft counter weight with respect to the rotor counter weight.

17. The electric motor rotor of claim 16 wherein the rotor end ring outer surface has thereon a second deformable lug, and wherein the rotor counter weight has therethrough a second bore receiving the second lug, the second lug being deformed to axially fix the rotor counter weight to the rotor.

18. The electric motor rotor of claim 17 wherein the counter weight is C-shaped and has opposites ends, wherein each bore is located adjacent a respective one of the ends, and wherein the recess is located in the rotor counter weight inner surface between the bores.

19. The electric motor rotor of claim 18 wherein the projections are cogs.

* * * * *